(12) United States Patent
Bessemer et al.

(10) Patent No.: US 6,488,873 B1
(45) Date of Patent: Dec. 3, 2002

(54) APPARATUS AND METHOD FOR PRODUCING AND CUTTING EXTRUDED MATERIAL USING TEMPERATURE FEEDBACK

(75) Inventors: Robert H. Bessemer, Pittsburgh, PA (US); William T. Jones, East Grand Rapids, MI (US); Robert L. Pader, Pittsburgh, PA (US)

(73) Assignee: The Conair Group, Inc., Pittsburgh, PA (US)

( * ) Notice: Subject to any disclaimer, the term of this patent is extended or adjusted under 35 U.S.C. 154(b) by 0 days.

(21) Appl. No.: 09/450,383

(22) Filed: Nov. 29, 1999

(51) Int. Cl.⁷ .......................... B29C 47/92; B29C 47/90
(52) U.S. Cl. .................... 264/40.6; 264/148; 264/209.4
(58) Field of Search ............................... 264/40.6, 145, 264/148, 150, 209.4, 210.1, 210.5, 560; 425/71, 143, 302.1

(56) References Cited

U.S. PATENT DOCUMENTS

| | | | |
|---|---|---|---|
| 4,530,650 A | | 7/1985 | Milani |
| 4,685,879 A | | 8/1987 | Purstinger et al. |
| 5,346,379 A | | 9/1994 | Wolfl et al. |
| 5,937,521 A | * | 8/1999 | March et al. ............... 264/148 |
| 6,019,934 A | * | 2/2000 | Schulte ....................... 264/150 |

FOREIGN PATENT DOCUMENTS

| | | |
|---|---|---|
| DE | 3301556 | 5/1990 |
| EP | 0 248 280 | 12/1987 |
| EP | 0 425 944 | 1/1994 |
| FR | 78 33678 | 6/1980 |
| GB | 2 127 183 | 7/1986 |
| GB | 2 218 030 | 11/1989 |

* cited by examiner

*Primary Examiner*—Mark Eashoo
(74) *Attorney, Agent, or Firm*—Buchanan Ingersoll, P.C.

(57) ABSTRACT

An apparatus and method for extruding, cooling and cutting can include an extruder for producing an extrudate which can be fed through appropriate sizing, support and cooling devices, which can include a vacuum chamber, cooling chamber, and calibrators, which can have internal cooling passageways. The apparatus can also include a cutting blade, a programmable temperature controller for controlling the temperature of the extrudate prior to being cut by the cutting blade, and a temperature sensor, which can be positioned near the cutting blade and provide feedback to the temperature controller. The method can include sensing the temperature of the extrudate, at a point near the cutting blade, after it is fed through the sizing, support and cooling devices and before being cut. Such feedback can be used to control the temperature of the extrudate such that the extrudate is maintained within a desired range of temperature as it is cut. The temperature controller can automatically cool and maintain the extrudate within a desired range of temperatures using the temperature feedback at the point near the cutting blade. Where calibrators are used the apparatus can include additional temperature sensors at different sides of a multi-sided extrudate at a point near where the extrudate exits the calibrator. Such additional temperature feedback can be used by a temperature controller to adjust the temperature of the extrudate, and also at different surfaces of a multi-sided extrudate.

13 Claims, 4 Drawing Sheets

APPARATUS AND METHOD FOR PRODUCING AND CUTTING EXTRUDED MATERIAL USING TEMPERATURE FEEDBACK

BACKGROUND

The invention relates generally to the extrusion and cutting of thermoplastic material, and more particularly to using feedback from a temperature sensor to provide control over the cooling rate of the extruded material to improve the process of cutting the extrusion.

Methods and systems are known the art for simultaneously producing and cutting a thermoplastic extrusion in a continuous process. For example, the apparatus may include an extruder to produce a continuous extrusion, whether hollow or solid. In association with the extruder, such apparatus may include a vacuum chamber, in the case of hollow extrusions, and a cooling chamber to cool the extrudate as it is extruded. A belt or rollers may also be provided to feed the extrudate from the extruder to a cutting blade which can cut the extrudate to desired lengths. The vacuum chamber can help support a hollow extrusion until it is sufficiently cooled to maintain its shape. Where the extrusion is solid or semi-hollow (such as a channel), one or more devices known as calibrators can be used in place of the vacuum chamber in order to align and size the extrusion as it is produced and until sufficiently cooled. The calibrators can have internal passageways forming cooling circuits through which coolant can be circulated to cool the extrudate as it passes through the calibrators. Such known apparatus can further include a cooling chamber, which can be partially or completely filled with coolant to cool the extrudate as it passes through the chamber. Alternatively, instead of immersing the hot extrudate in coolant, the cooling chamber can have spray nozzles which spray the extrudate with the coolant to effect the cooling process. The cooling processes in the vacuum chamber, calibrators and the cooling chamber can be controlled by conventional electronic devices in a known manner which is described in more detail below.

The conventional method can include feeding a continuous hot extrudate from the extruder through a vacuum chamber, or calibrators, and then to a cooling chamber which cools the hot extrudate to a desired temperature. Although the vacuum chamber and calibrators provide some initial cooling, the cooling is mainly provided in the cooling chamber. From the cooling chamber the cooled extrudate is fed to cutting blades which can cut the cooled extrudate into sections of the desired lengths. The temperature of the extrudate when cut by the cutting blades can be crucial to obtaining an acceptable product. If the temperature of the extrudate is either too hot or too cold when it is cut, the cut sections can be of unacceptable quality. For example, if the extrudate is too cold when cut, deformation or fracturing can occur. Conversely, if the extrudate is too hot when cut, the ends of the cut sections may stick together. In additional to problems with the cut parts, the extrudate may warp if the temperature is not controlled properly. Consequently, it can be vital to control the temperature of the extrudate to prevent warping and so that it is within a certain desired range of temperatures at the point where it is cut by the cutting blade in order to produce products of an acceptable quality. In order to obtain the proper temperature of the extrudate at the point of cutting, the conventional manner is based upon a manually performed trial-and-error process. For example, a certain temperature is estimated and the cooling chamber is brought to that temperature. Next, the quality of the cut is closely observed to determine whether the temperature of the extrudate is too hot or too cold. If the cutting process indicates that the temperature of the extrudate is too hot, the temperature in the cooling chamber is lowered, typically in a small increment to avoid overshooting the desired temperature. After the temperature adjustment has had an opportunity to take effect, the cutting process is again closely observed to determine whether the appropriate temperature has been achieved. If the cut quality again indicates that a temperature adjustment is needed, the process is repeated by adjusting the temperature in the cooling chamber and observing the cut quality. This procedure may be repeated over and over until the cut quality indicates that the proper temperature has been achieved. In addition to the time required to arrive at the desired temperature, material is wasted with each cut that produces unacceptable parts until the proper temperature is finally achieved.

Accordingly, there is a need for an improved apparatus and method for bringing the extrudate to the proper temperature in a more efficient and less wasteful manner.

SUMMARY

An apparatus and method for extruding and cutting an extrusion can be provided which more quickly and efficiently brings a hot extrudate to the temperature required to permit the extrudate to be properly cut. The apparatus can include an extruder for producing a continuous extrusion which can be fed through a vacuum chamber, or calibrators, a cooling chamber which brings the extrudate to the desired temperature, and a cutting blade for cutting the extrudate into desired lengths. The apparatus can include a temperature controller for controlling the temperature in the cooling chamber. The temperature controller can include a programmable processor for automatically regulating the temperature in the cooling chamber. According to a presently preferred embodiment, the apparatus can include a temperature sensor which can be positioned near the cutting blade to provide feedback on the temperature of the extrudate at a point near the cutting blades. Such feedback can be provided to the temperature controller which can use the feedback information to control the temperature in the cooling chamber. Similarly to the conventional manner, the cut quality can be observed to determine when an acceptable temperature has been arrived at. In contrast however, the temperature at the cooling chamber can be regulated directly from the actual temperature of the extrudate near the cutting blade, instead of simply gradually adjusting the temperature up and down based upon what the cut looks like, as in the trial-and-error method. Also, once a proper temperature has been arrived at, that information can be stored in a memory portion of the processor in the temperature controller, which can then use that information as a reference point in the future each time the process is carried out using the same materials and cutting conditions. Thus, no observation of the cut quality need normally be done to start running the process the next time and the system can automatically adjust to changes in ambient temperatures. In order to ensure that the temperature of the extrudate is within a desired range of temperatures at the point at which the extrudate is cut by the cutting blade, the temperature controller can continuously monitor feedback from the temperature sensor near the cutting blade. Any necessary adjustments in the temperature can be automatically carried out by the temperature controller, thus eliminating much, if not all, of the manual adjustments previously required according to the prior art method.

Moreover, where calibrators are used additional temperature sensors can be utilized in conjunction with cooling circuits provided in the calibrators. The temperature feedback from such sensors can be provided to a temperature controller which can use such feedback to control the temperature of the coolant circulated through the aforementioned cooling circuits. Besides being used to generally control the cooling of the extrudate, similarly to as described in connection with the cooling chamber, this feedback information and temperature control can advantageously permit different surfaces of a multi-sided extrudate to be cooled at different rates.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN PREFERRED EMBODIMENTS

Figure 1:
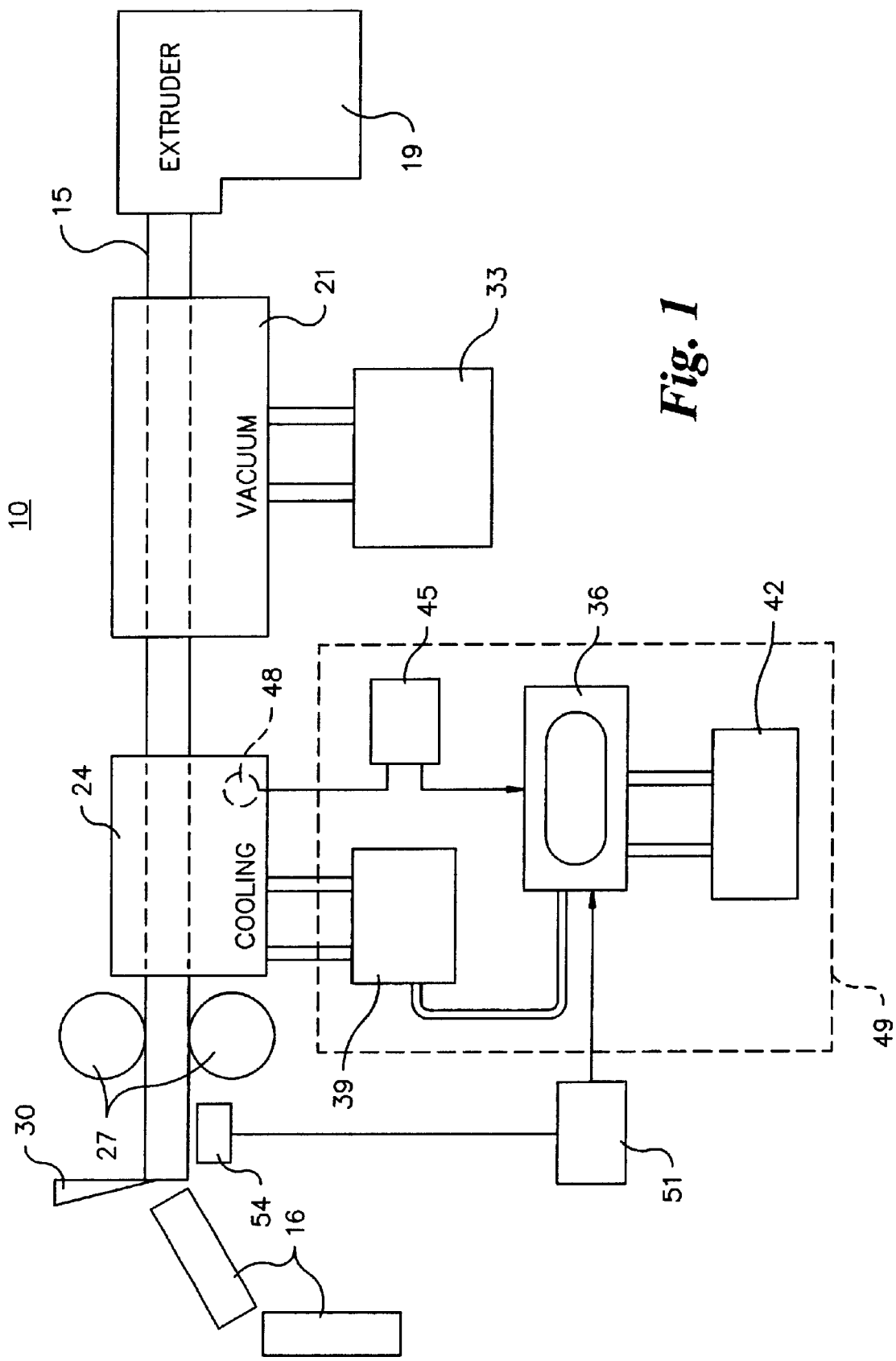
FIG. 1 shows a presently preferred embodiment of an extrusion and cutting apparatus according to the invention.

Referring now to the drawing figures wherein like reference numbers refer to similar parts throughout the several views, FIG. 1 illustrates an apparatus 10 according to a presently preferred embodiment of the invention for producing and cutting an extrudate 15. In the embodiment shown, the extrudate 15 can be hollow. The apparatus 10 can include an extruder 19 which produces, for example, a hollow extrudate 15 which can be directed through a vacuum chamber 21 and a cooling chamber 24. The vacuum chamber 21 can provide support to the hollow extrudate 15 until it is sufficiently cooled to a stable temperature. Rollers 27 can be provided to feed the extrudate 15 to a cutting blade 30 which can cut the extrudate 15 into sections of a desired length. A conventional controller 33 for the vacuum chamber 21, which can include a pump, sensors and associated electronic control hardware/software, can be provided to regulate the vacuum in the vacuum chamber 21 in a well known manner. The vacuum chamber 21 and controller 33 can be provided in order to stabilize the hollow extrudate 15 until it has cooled sufficiently to maintain its shape. Without the vacuum chamber 21, the walls of the hollow extrudate 15 could deform or collapse before the extrudate 15 had time to cool to a sufficiently rigid state to support its shape. One type of vacuum chamber for performing this function is described, for example, in U.S. Pat. No. 5,340,295 to Preiato et al.

Although some, and possibly all, cooling of the extrudate 15 could be accomplished using a combined vacuum/cooling chamber, such as by providing coolant in a vacuum chamber, a separate cooling chamber 24 can be utilized in the presently preferred embodiment. The cooling chamber 24 can, for example, use water as the heat transfer fluid, and can be controlled to bring the extrudate 15 to the desired temperature, and to generally maintain it at that temperature. A temperature controller 49 can include a pump, temperature sensors and electronic control devices. For example, the controller 49 can include a temperature regulator 36 and a temperature monitoring device 45, which can use feedback, such the water temperature in the cooling chamber 24, from a temperature sensor 48. The temperature regulator 36 can also include a heat transfer unit 42, for example a "chiller" unit. The controller 49 can provide a control system to automatically regulate the temperature of the heat transfer fluid in the cooling chamber 24 to the desired temperature. The regulator 36 can receive feedback regarding the temperature of the heat transfer fluid via the temperature sensor 48 and can control the pump 39 to regulate the temperature up or down. For example, if the temperature of the heat transfer fluid is too high, the regulator 36 can control the pump 39 to deliver chilled heat transfer fluid to the cooling chamber 24 from the heat transfer unit 42. Conversely, if the heat transfer fluid temperature is too low, the regulator, which can include an internal heating unit, can control the pump to provide heated heat transfer fluid from the regulator 36. Using the temperature feedback from sensor 48, the regulator 36 can thus generally maintain the temperature in the cooling chamber 24 within a range of desired temperatures.

According to a presently preferred embodiment of the apparatus 10, an additional temperature monitoring device 51 and temperature sensor 54 can be provided. Feedback from the second temperature sensor 54, which can preferably be positioned to measure the temperature of the extrudate 15 at a point near the cutting blade 30. The temperature monitoring device 51 can provide additional, valuable feedback to the temperature controller 49 for improved control over the cooling, and more particularly, the cutting process. The temperature of the extrudate 15 at the cutting blade 30 can be important feedback information for regulating the temperature of the heat transfer fluid in the cooling chamber 24 because of the desirability to regulate the cooling of the extrudate 15 such that the extrudate 15 is generally maintained within a certain range of desired temperatures when the extrudate 15 is cut by the cutting blade 30. This is desirable because there is a certain range of temperatures of the extrudate 15 at which the cutting process is most efficiently carried out. For example, if the temperature of the extrudate 15 at the cutting blade 30 is too high, the cut extrudate sections 16 will tend to stick together at the junction of the cut ends of the sections 16. On the other hand, for example, if the temperature of the extrudate 15 at the cutting blade 30 is too low, fracturing or deformation of the cut extrudate sections 16 can occur which produces an unacceptable section 16.

In the prior art process, the temperature of the extrudate 15 is controlled manually by regulating the temperature of the heat transfer fluid in the cooling chamber 24 according to a "trial and error" process. For example, an operator would observe the characteristics of the extrudate 15 as it is being cut at the blade 30. Based on the characteristics of the cut, the operator would determine whether the extrudate 15 was too hot or too cold. For example, if the ends of the cut sections 16 were tending to stick together, this could usually indicate that the temperature of the extrudate 15, at the point where the blade 30 was cutting it, was too high. Conversely, if the cut sections 16 were tending to fracture or deform when cut, this would normally indicate that the temperature of the extrudate 15 was too cold when it was cut. Based upon these observations, the operator would slightly adjust the temperature of the heat transfer fluid, which can be water, in the cooling chamber 24 accordingly. The operator would continue gradually adjusting the temperature at the cooling chamber 24, either up or down, until a temperature was arrived at which resulted in the extrudate 15 having a temperature at a point near the cutting blade 30 which produced an acceptable cut. Typically, the temperature would have to be adjusted in relatively small increments to avoid overshooting the proper temperature range. Consequently, the process of locating and maintaining the desired temperature tends to be slow and can also result in some amount of wasted materials in the process of arriving at the proper temperature range.

According to the present invention, this inefficient, manual trial-and-error method can be replaced by an improved method which can be faster and less wasteful. By utilizing feedback from the temperature sensor 54 near the blade 30, the regulation of the temperature in the cooling chamber 24 can be automatically controlled, for example, electronically by programming a processor, which can be part of the temperature regulator 36. The controller 49 can regulate the temperature of the heat transfer fluid in the cooling chamber 21 based upon the temperature of the extrudate 15 near the cutting blade 30. In this manner, the slow manual trial-and-error process of adjusting the temperature of the cooling chamber 24 can be replaced with a more efficient, accurate and automated process.

In a presently preferred embodiment of the invention, the temperature controller 49 includes the regulator 36 which can be connected the pump 39. The pump 39 can be used to circulate warm or cool heat transfer fluid through the cooling chamber 24 to affect the temperature thereof. The regulator 36 can be, for example, a device commonly called a "Thermolator™," which can include a programmable processor and may also have heating element for heating the heat transfer fluid. The heat transfer unit 42 can be provided to supply chilled heat transfer fluid to lower the temperature in the cooling chamber 24. Although the heat transfer fluid is preferably water, other types of heat transfer fluid could also be used. Additionally, the cooling chamber 24 can simply be partially, or completely, filled with heat transfer fluid or may have spray nozzles (not shown) for spraying the heat transfer fluid onto the extrudate 15.

Figure 2:
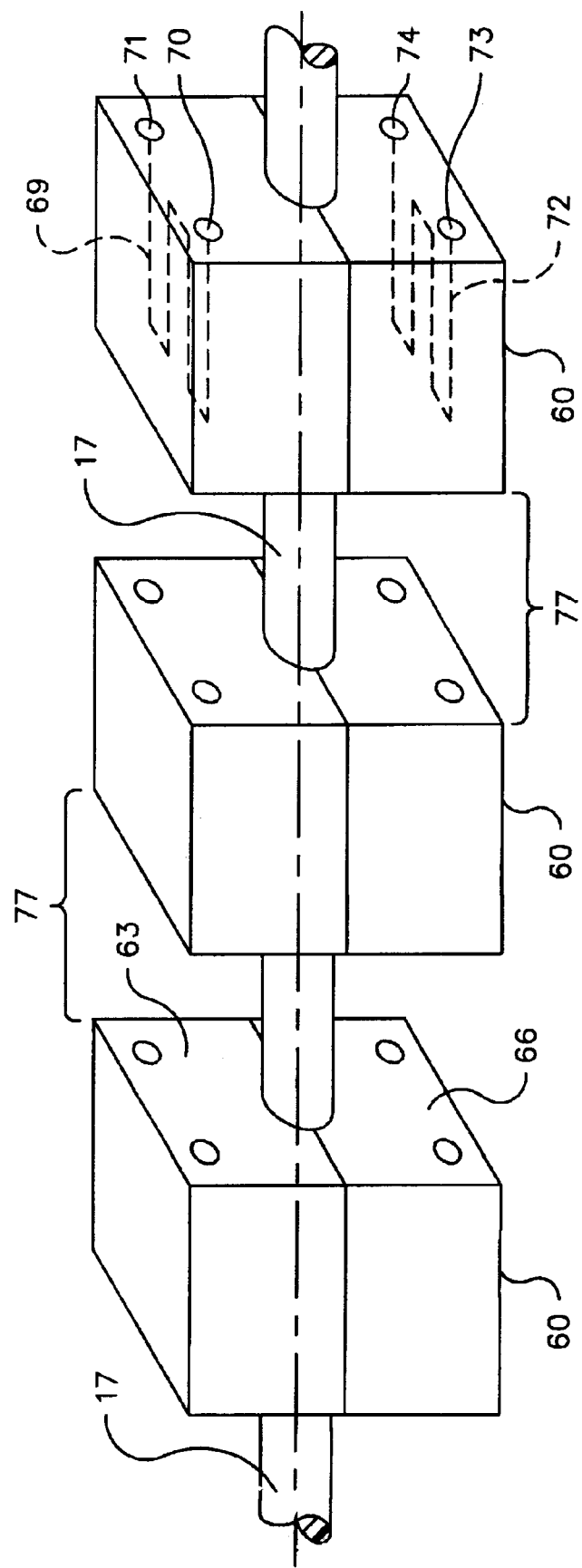
FIG. 2 shows how calibrators may be used instead of, or in addition to, a vacuum chamber.

In some cases, an extrudate 17 may have a solid, or semi-hollow cross section, such as a channel, instead of being hollow. Referring to FIG. 2, in such circumstances where the extrudate 17 is solid or semi-hollow, one or more sizing devices 60, commonly referred to as "calibrators," can be employed in place of the vacuum chamber 21. As shown, multiple calibrators 60 can be provided in a spaced apart manner to provide air gaps 77 therebetween. The calibrators 60 can commonly be two piece members having an upper section 63 that can be hinged to a lower section 66. Additionally, cooling circuits 69 and 72 can be provided in each of the upper 63 and lower 66 sections of the calibrators 60. Each cooling circuit 69, 72 can have inlet 70, 73 and outlet 71, 74 openings which can be plumbed to a source of heat transfer fluid. In this manner, heat transfer fluid can be pumped through each of the cooling circuits 69, 72 in order to cool the extrudate 17 as it is fed through each calibrator 60. The temperature of the extrudate 17 can be regulated using the calibrators 60 in combination with the temperature sensor 54 and temperature controller 49, in a manner similar to as described above for the process using a cooling chamber 24. Alternatively, the calibrators 60 could be used in combination with a cooling chamber 24.

Figure 3:
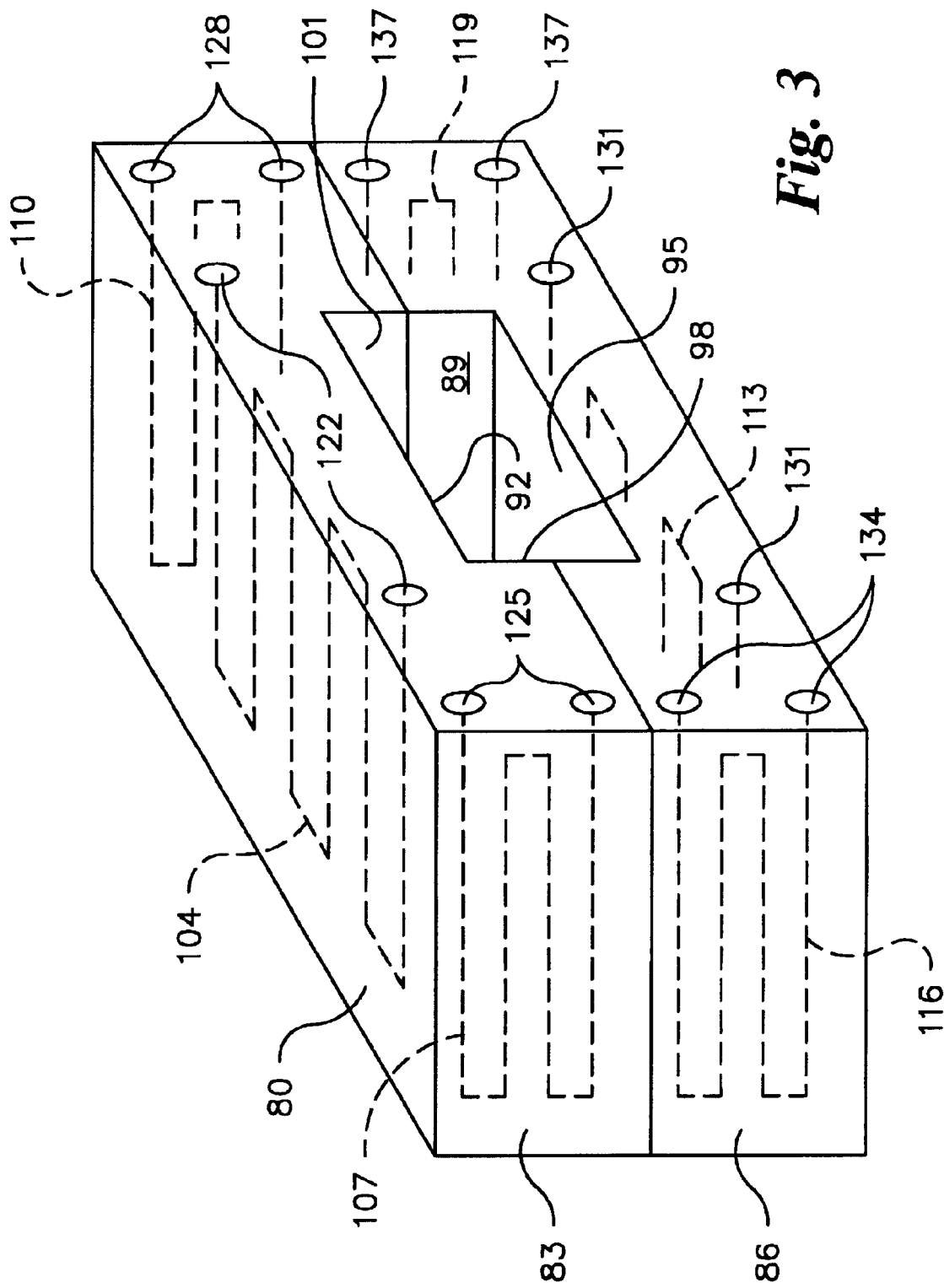
FIG. 3 shows a calibrator having multiple cooling circuits provided in each face thereof.

Referring now to FIG. 3, instead of a calibrator 60 having one cooling circuit in each of the upper and lower sections, a presently preferred alternative calibrator 80 can have multiple cooling circuits provided in each of the upper 83 and lower 86 sections. For example, the upper section 83 can include a top cooling circuit 104 with inlet and outlet openings 122, a front cooling circuit 107, with inlet and outlet openings 125 and a rear cooling circuit 110 with inlet and outlet openings 128. Similarly, the lower section 86 can include a bottom cooling circuit 113 with inlet and outlet openings 131, a front cooling circuit 116 with inlet and outlet openings 134 and a rear cooling circuit 119 with inlet and outlet openings 137.

The multiple cooling circuits 104, 107, 113, 116 and 119 can be effectively utilized to cool multiple individual surfaces of a complex shaped extrudate to varying degrees. Such localized control of the temperature at different surfaces of a multi-sided extrudate can provide the ability to control the cooling of the different sides at different rates. The different cooling rates applied can depend on various factors such as, for example, a different thickness of the different sides of the complex shaped extrudate. Where different sides have different thickness, the temperature at different sides of the extrudate can vary. Consequently, one side of the extrudate may be within a desired temperature range while a different side is not, thus adversely affecting the cutting portion of the process. Moreover, such uneven cooling can cause the extrudate to warp as one side of the extrudate can begin to "pull over" heat from another side. However, using such multiple cooling circuits 104, 107, 113, 116, 119 can permit individual control over the temperature at the different sides of the extrudate. As a result, each of multiple sides of the complex shaped extrudate, such as, for example, the extrudate 18 shown in FIG. 5, can be generally maintained within the desired temperature range, which facilitates the cutting of the extrudate 18 by the cutting blade 30.

Additionally, different cooling rates can also be applied to correct, for example, undesirable warping, if such occurs during extrusion and cooling of the extrudate. Although the shape of the opening 89 through which an extrudate can be fed is shown having a generally rectangular cross section, other shapes can be provided, including more complex shapes such as the extrudate 18 referred to above.

Figure 4:
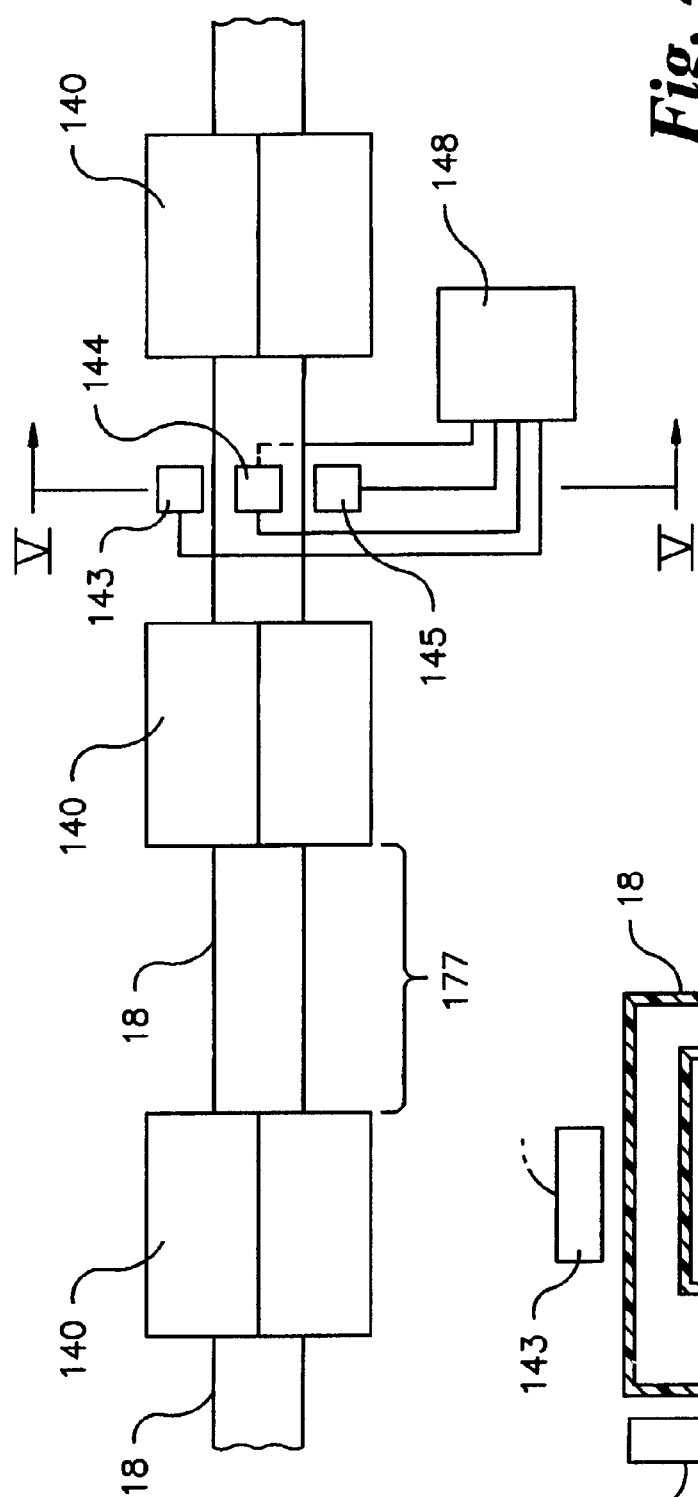
FIG. 4 shows a presently preferred embodiment of multiple temperature sensors being used with a calibrator having multiple cooling circuits.

As shown in FIG. 4, temperature sensors can be positioned, for example, in the air gaps 77 between the calibrators 140. Feedback from the multiple temperature sensors 143–146 can be provided to a device such at the temperature controller 49, shown in FIG. 2.

Figure 5:
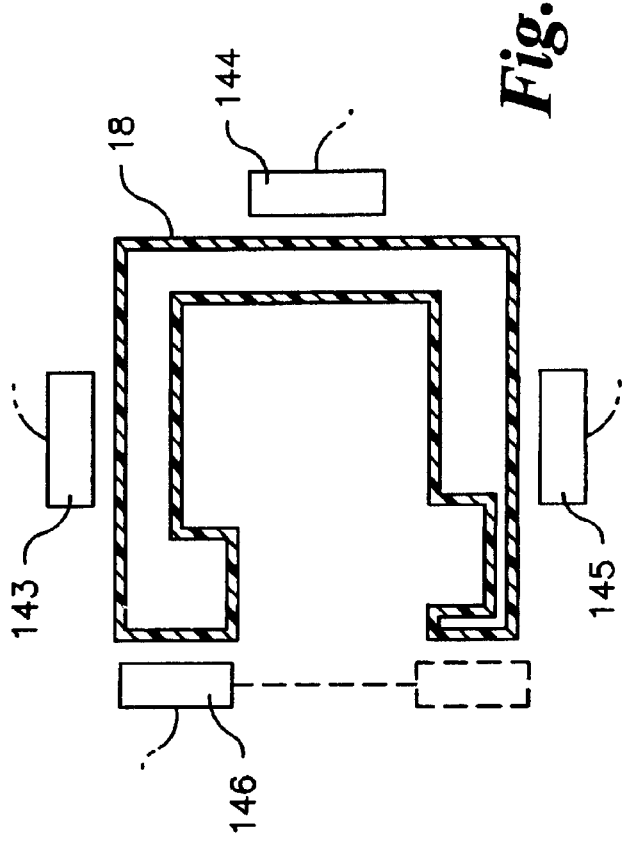
FIG. 5 shows how multiple temperature sensors can be associated with the different surfaces of a multi-sided extrudate such as shown in FIG. 4.

The complex shaped extrudate 18 can have, for example, the cross section shown in FIG. 5. In the case of such multi-sided extrudate 18, four temperature sensors 143–146 can be employed. Presumably, an individual cooling circuit would be associated with each temperature sensor 143–146 to enable control over the temperature of that face of the calibrator 140. Moreover, if the calibrator 140 included more than four cooling circuits, such as the six cooling circuits shown in the calibrator 80 in FIG. 3, six temperature sensors could be used. Where multiple temperature sensors are employed, one temperature sensor may typically be associated with either each face of the multi-side extrudate 116, or with each cooling circuit that may be provided in the calibrator 140. The temperature sensors 143–146 can, for example, be conveniently positioned in the air gaps 177 between the calibrators 140. Each temperature sensor 143–146 can provide feedback on the temperature at each face, or portion thereof, of the complex shaped extrudate 18. Thus, where multiple cooling circuits are utilized in the calibrators, the temperature at each face of the extrudate 18 may be adjusted as desired in order to ensure that the extrudate 18 is cooling in a uniform manner. Additionally, the cooling circuits can be controlled to adjust the temperature at the different sides of the extrudate to provide even cooling to avoid warping, bowing or other defects which can otherwise occur due to uneven cooling. Each temperature sensor 143–146 can be connected to a temperature monitoring device 148 which can supply the feedback to, for example, a device such as the temperature controller 49 shown in FIG. 1.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method for cooling and cutting an extrusion comprising:
   a. producing an extrudate;
   b. feeding said extrudate toward a cutting blade;
   c. cooling said extrudate while feeding it toward said cutting blade;
   d. sensing a first temperature of said extrudate at a point near said cutting blade; and
   e. controlling said cooling as a function of said first temperature to maintain said first temperature within a desired range of temperatures which facilitates cutting said extrudate with said cutting blade.

2. The method of claim 1 further comprising:
   a. cooling said extrudate by feeding said extrudate through a cooling chamber at a second temperature; and
   b. controlling said cooling by controlling said second temperature as a function of said first temperature to maintain said first temperature within said desired range of temperatures.

3. The method of claim 2 further comprising:
   a. sensing ambient temperature; and
   b. controlling said second temperature as a function of said first temperature and said ambient temperature to maintain said first temperature within said desired range of temperatures.

4. The method of claim 3 wherein cooling said extrudate in said cooling chamber further comprises at least one of spraying liquid coolant on said extrudate and submerging said extrudate at least partially in said liquid coolant.

5. The method of claim 4 wherein controlling said second temperature further comprises one of decreasing and increasing a temperature of said liquid coolant.

6. The method of claim 1 further comprising:
   a. passing said extrudate through at least one calibrator;
   b. cooling said extrudate while passing it through said at least one calibrator;
   c. circulating a coolant at a second temperature through said at least one calibrator to cool said extrudate as it is passed therethrough; and
   d. controlling said second temperature as a function of said first temperature to maintain said first temperature within said desired range of temperatures.

7. The method of claim 6 further comprising:
   a. providing a plurality of cooling circuits within said at least one calibrator, each of said plurality of cooling circuits associated with a respective one of multiple sides of said at least one calibrator;
   b. sensing said first temperature at selected ones of multiple sides of said extrudate which are associated with respective ones of said multiple sides of said at least one calibrator;
   c. circulating a coolant through each of said plurality of cooling circuits; and
   d. individually controlling a temperature of said coolant circulated in selected ones of said plurality of cooling circuits as a function of said first temperature associated with said selected ones of said multiple sides of said extrudate such that said first temperature at selected ones of said multiple sides is maintained within said desired range of temperatures.

8. The method of claim 7 further comprising individually controlling said coolant temperature circulated in each of said plurality of cooling circuits.

9. The method of claim 6 further comprising:
   a. sensing a third temperature of said extrudate at a point near where said extrudate exits said at least one calibrator; and
   b. controlling said second temperature as a function of said third temperature.

10. The method of claim 6 further comprising:,
    a. cooling said extrudate by feeding said extrudate through a cooling chamber at a third temperature; and
    b. controlling said cooling by controlling said third temperature as a function of said first temperature to maintain said first temperature within said desired range of temperatures.

11. The method of claim 10 further comprising:
    a. sensing ambient temperature; and
    b. controlling said third temperature as a function of said first temperature and said ambient temperature to maintain said first temperature within said desired range of temperatures.

12. The method of claim 11 wherein cooling said extrudate in said cooling chamber further comprises at least one of spraying liquid coolant on said extrudate and submerging said extrudate at least partially in said liquid coolant.

13. The method of claim 12 wherein controlling said third temperature further comprises one of decreasing and increasing a temperature of said liquid coolant.

* * * * *